United States Patent [19]
Wertheimer et al.

[11] Patent Number: 5,118,935
[45] Date of Patent: Jun. 2, 1992

[54] COMPOSITE IMAGING MASK

[75] Inventors: Alan L. Wertheimer, Pittsford; Thomas W. Dey, Springwater, both of N.Y.

[73] Assignee: Eastman Kodak Company, Rochester, N.Y.

[21] Appl. No.: 662,141

[22] Filed: Feb. 28, 1991

[51] Int. Cl.⁵ .................................................. G02B 5/00
[52] U.S. Cl. ........................ 250/237 R; 250/201.9; 356/121
[58] Field of Search ............... 250/201.9, 237 R; 356/121

[56] References Cited

U.S. PATENT DOCUMENTS

| | | | |
|---|---|---|---|
| 4,719,343 | 1/1988 | Tressler, III | 250/208.6 |
| 4,725,138 | 2/1988 | Wirth et al. | 356/121 |
| 4,750,818 | 6/1988 | Cochran | 359/300 |
| 4,950,878 | 8/1990 | Ulich et al. | 250/201.9 |
| 5,049,734 | 9/1991 | Marino | 250/201.9 |

Primary Examiner—Constantine Hannaher
Attorney, Agent, or Firm—Stephen C. Kaufman

[57] ABSTRACT

A novel composite imaging mask suitable for employment in a method for simultaneously determining coarse and fine petal piston in a segmented imaging assembly. The mask comprises a transparent substrate comprising two spaced-apart apertures, which apertures are dedicated to coarse petal alignment; a first overlay deposited on a face of the substrate, for defining four phase retardation regions dedicated to fine petal alignment; a second overlay comprising an opaque coating, the second overlay deposited on the face of the substrate and complementary to the four phase retardation regions and the apertures, and a means for spirally separating the coarse and fine alignment entities.

4 Claims, 16 Drawing Sheets

| PISTON OPD (WAVES) | HIGHEST LEFT PEAK INTENSITY | HIGHEST RIGHT PEAK INTENSITY | (A) RATIO OF LEFT/RIGHT PEAK INTENSITY | (B) RATIO OF (LEFT−RIGHT) TO (LEFT+RIGHT) |
|---|---|---|---|---|
| 0 | 2.5 UNITS | 2.5 UNITS | 1.0 | 0.0 |
| 1/40 | 2.6 | 2.5 | 1.083 | 0.040 |
| −1/40 | 2.5 | 2.6 | 0.923 | −0.040 |
| 1/20 | 2.7 | 2.3 | 1.174 | 0.080 |
| −1/20 | 2.3 | 2.7 | 0.851 | −0.080 |
| 1/10 | 2.9 | 2.1 | 1.381 | 0.160 |
| −1/10 | 2.1 | 2.9 | 0.724 | −0.160 |
| 1/8 | 2.9 | 2.0 | 1.45 | 0.184 |
| −1/8 | 2.0 | 2.9 | 0.690 | −0.184 |
| 1/4 | 3.0 | 1.5 | 2.0 | 0.33 |
| −1/4 | 1.5 | 3.0 | 0.5 | −0.33 |
| 3/8 | 3.0 | 2.0 | 1.5 | 0.20 |
| −3/8 | 2.0 | 3.0 | 0.667 | −0.20 |
| 1/2 | 2.5 | 2.5 | 1.0 | 0.0 |
| −1/2 | 2.5 | 2.5 | 1.0 | 0.0 |

FIG. 11

COMPOSITE IMAGING MASK

CROSS-REFERENCE TO RELATED APPLICATIONS

This application is related to a U.S. patent application Ser. No. 07/621,400 filed Nov. 30, 1990 by A. Wertheimer; to a U.S. patent application Ser. No. 07/661,781 filed Feb. 26, 1991, by Dey et al; and to a U.S. patent application Ser. No. 07/662,156 by Wertheimer et al. which is being filed contemporaneously with this application. The entire disclosures of each of these applications is incorporated by reference herein. Each of these applications is copending and commonly assigned.

FIELD OF THE INVENTION

This invention relates to a composite imaging mask suitable for employment in a method for determining coarse and fine petal piston in a segmented imaging assembly.

INTRODUCTION TO THE INVENTION

We are working on segmented imaging assemblies, in particular, segmented optical imaging assemblies.

One example of a segmented optical imaging assembly is shown in FIG. 1. The FIG. 1 segmented optical imaging assembly 10 (hereinafter, assembly 10) comprises a system including a center mirror segment 12, and a set of six mirror segments, or petals (numerals 14–24). The petals (14–24) circumscribe the center mirror segment 12. The assembly 10 may be employed to accept source radiation, for example, broadband or polychromatic light, and collectively re-image the input source radiation at a unique focal point.

A second example of a segmented imaging assembly is shown in FIGS. 2A, B, comprising cross-sectional and top views, respectively. A FIG. 2A, B segmented optic 26 comprises a portion of an advanced X-ray astronomical telescope. In particular, the segmented optic 26 comprises a set of parabolically shaped, cylindrically nested, physically de-coupled, discrete mirror segments 28, 30, 32. The mirror segments (28–32), or petals, can cooperate to function as a grazing incident reflecting optical assembly.

The optical segmented imaging assemblies illustrated in FIGS. 1 and 2A, B are particular examples of segmented imaging assemblies. In general, and for purposes of the present invention, a segmented imaging assembly may be defined as an imaging assembly comprising at least two or more physically separate parts, e.g., petals, designed to act in an imaging function as a single, larger monolithic component.

It is indicated above that the present invention relates to a composite imaging mask suitable for employment in a method for determining coarse and fine petal piston, in a segmented imaging assembly of the type just defined. The concept and a problem of petal piston are now explained, with continued reference, for purposes of pedagogy, to the FIG. 1 segmented optical imaging assembly 10, as well as reference to a FIG. 3.

In particular, attention is now directed to FIG. 3, which shows a partial edge-view 34 of the FIG. 1 assembly 10. FIG. 3 shows the center mirror 12, the adjacent petals 14 and 20, an assembly optical axis 36, and a focal point 38 located on the assembly optical axis 36.

Now, it may be observed that the center mirror 12 and petal 20 define a continuous surface curvature, so that incoming radiation to the assembly 10, represented by rays of light 40, 42, and 44, may be uniquely returned to the focal point 38, by the tandem operation of the center mirror segment 12 and the petal 20. Thus, the source radiation from the segments 12 and 20 may be considered to be "in phase" with respect to the focal point 38. For this situation, one can say that there is no petal piston between the center mirror 12 and adjacent petal 20.

For the situation of the FIG. 3 petal 14, however, there is petal piston. Petal piston has been induced by way of the parallel, translational displacement D of the petal segment 14, relative to the center 12. The displacement D is such that the center mirror segment 12 and the petal 14 no longer define a continuous surface curvature, but rather effect an abrupt curvature singularity. In effect, this displacement D, which is the petal piston, induces an optical path difference (OPD) or phase retardation, between radiation wavefronts returned to the focal point 38 by the disparate segments 12, 14.

(Note in FIG. 3 that there is also a small shift of the location of the focused radiation represented by a ray 46. However, when piston D, which may be either positive or negative, is on the order of the wavelength of the radiation, and the dimension of the imaging aperture 34 is much greater than the wavelength of the radiation, the dominant effect is due to an electromagnetic interference between the beams of radiation from the various segments.)

The petal piston D between segments 12 and 14 can result in a significant degradation of image quality everywhere in the region of the focal point 38, unless the petal piston D is eliminated, or at least reduced to a value very much less than one half of the wavelength of the radiation.

SUMMARY OF THE INVENTION

The problem of petal piston (D) in a segmented imaging assembly is addressed in Wertheimer's U.S. patent application Ser. No. 07/621,400, and in Dey et al's. U.S. patent application Ser. No. 07/661,781, referenced above.

Wertheimer discloses a method for quantitatively determining petal piston in a segmented imaging system, and, in particular, solves the problem for those cases where one must make high precision or fine alignment measurements of axial position error (e.g., where D is typically less than one-half wave OPD).

Dey et al. also discloses a method for quantitatively determining petal piston in a segmented imaging system, and, in particular, complements the Wertheimer disclosure by solving the problem of petal piston (D) for those cases where one must make large petal piston or coarse alignment measurements (e.g., where D is typically greater than one-half wave OPD, to as much as 20 or more waves OPD).

Important advantages secured by the Wertheimer and Dey et al. methods, taken as a whole, include providing a complete solution (i.e., fine and coarse alignment) for quantitatively determining petal piston in a segmented imaging system.

The advantages secured by the combined Wertheimer and Dey et al. methods are not challenged or vitiated by the following critique of these methods. Namely, although the methods do indeed provide a complete solution to fine and coarse alignment determinations, they do not specify a means or a method for simultaneously effecting such a determination. Rather, one must first employ a first specified masking technique for obtaining the coarse alignment determination, and then one must secondly employ a second specified masking technique for obtaining the fine alignment determination (or, vice versa). Accordingly, one is obliged to factor in a time factor, and employ two different masks, in order to individually realize the Wertheimer, Dey et al. methodologies.

We have now discovered a novel composite imaging mask suitable for employment in a unique, single method for simultaneously determining coarse and fine petal piston in a segmented imaging assembly. This single method discovery has a critical advantage of maintaining all the virtues of the Wertheimer or Dey et al. methodologies, taken individually, while realizing an improved precision and a significantly enhanced economy of time and efficiency of operation, as compared to serially practicing these methodologies.

Accordingly, we now disclose a novel composite imaging mask suitable for employment in a single method for simultaneously determining coarse and fine petal piston alignment in a segmented imaging assembly, the composite imaging mask comprising:

a) a transparent substrate comprising two spaced-apart apertures dedicated to coarse petal alignment;

b) a first overlay deposited on a face of the substrate, for defining four phase retardation regions dedicated to fine petal alignment;

c) a second overlay comprising an opaque coating, the second overlay deposited on the face of the substrate and complementary to the four phase retardation regions and the two apertures; and, d) a means for spatially separating the coarse and fine alignment entities.

BRIEF DESCRIPTION OF THE DRAWINGS

The invention is illustrated in the accompanying drawing, in which:

FIG. 11 is a Table subsuming information set forth in the FIG. 10 point spread functions.

DETAILED DESCRIPTION OF THE INVENTION

Figure 1:
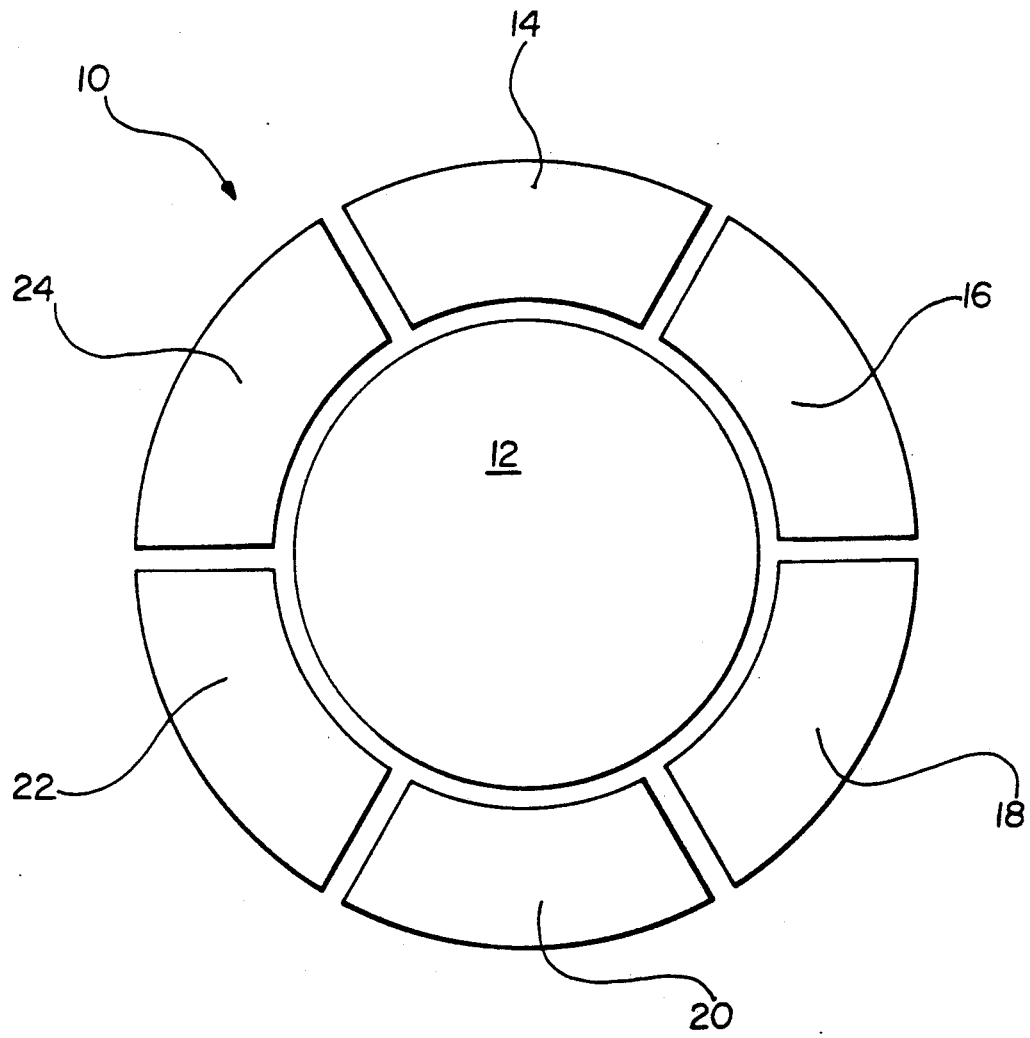
FIG. 1 shows a first example of a segmented optical imaging assembly.
Figure 2A:
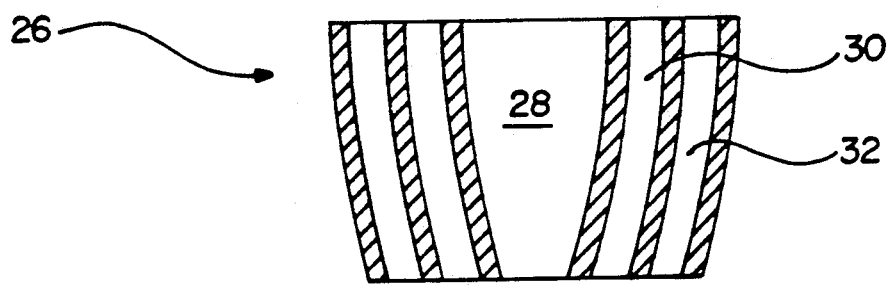
FIGS. 2A, 2B show a second example of a segmented optical imaging assembly.
Figure 2B:
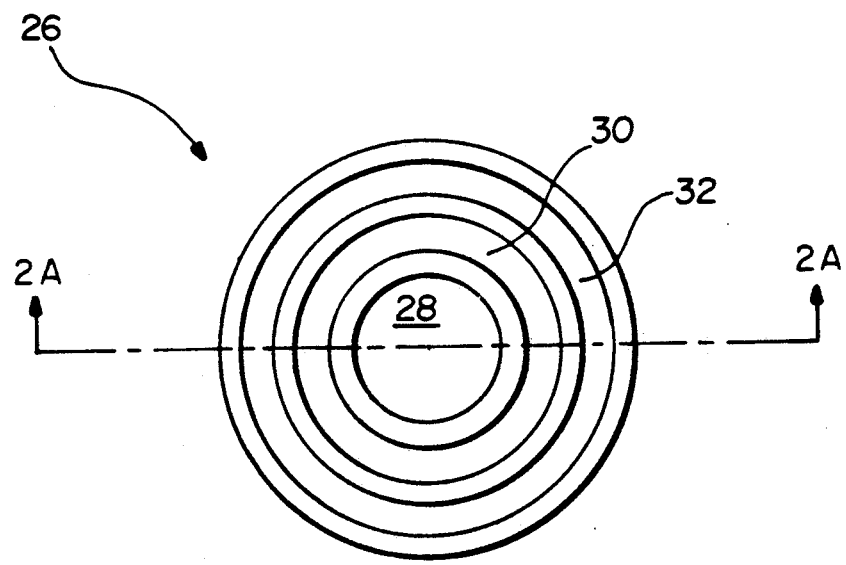

As summarized above, the novel composite imaging mask is suitable for employment in a method for simultaneously determining coarse and fine petal piston alignment in a segmented imaging assembly. Our procedure will now be as follows. First, we shall articulate particulars of the novel composite imaging mask (FIGS. 4A-D; 5A, B). Second, we shall demonstrate its employment in a segmented imaging assembly (FIG. 6), to the end, thirdly and fourthly, of demonstrating its utility in a method for determining coarse and fine petal piston alignment (FIGS. 7-12).

I. The Composite Imaging Mask

In general, the FIGS. 4A-D composite imaging masks can simultaneously fulfill a two-fold function, viz., coarse petal alignment by way of two spaced-apart apertures, and, fine petal alignment by way of four phase retardation regions ($A_1$, $A_2$, $A_3$, $A_4$). (A motivation for four phase retardation regions will become clearer below, when it is disclosed in the fine petal piston alignment method, how a FIGS. 4A-D imaging mask may be aligned to overlap with a reference component and a test component, or their optical image, for ascertainment of their relative piston.)

In general, the FIGS. 4A-D masks preferably comprise a transparent, homogeneous and uniformly thick substrate, larger than all the open regions $A_1$ through $A_4$, with an overlay deposited on a face of the substrate and comprising a thin film coating. The substrate may comprise, for example, glass, mica, or fused quartz. The thin film coating, on the other hand, may comprise fused quartz, magnesium fluoride or silicon dioxide, overlaid on the substrate by conventional techniques.

Recall that one function of the FIGS. 4A-D masks is to realize a series of four phase retardations, dispersed over four regions $A_1$–$A_4$. Accordingly, the thin film coating, say, for example, one comprising magnesium fluoride on one portion and no coating on an adjacent portion, is typically from 0.6 to 0.9 microns thick, or such as to generate a phase retardation in transmission of approximately one-half wave of radiation of interest.

Restated, and generalized, the mask regions $A_1$–$A_4$ can effect a predetermined and differential phase retardation $\phi_n$ in accordance with the following equation (1):

$$\phi_n = OPD = \frac{\text{thickness of overlay}}{\text{wavelength of radiation source}} \cdot (n_1 - n_2) \quad (1)$$

where $n_1$ and $n_2$ are the indices of refraction of the coating and portions adjacent to it, respectively, and OPD is the optical path difference, in the units of the wavelength of the radiation.

The FIGS. 4A-D detail four preferred geometric relationships defined by the substrate, the overlays, and a fabricated angular separation element. Note that for each of the four details, there is a set of two spaced-apart apertures, and an identifying sub-region ($A_1$, $A_2$, $A_3$, $A_4$), and that areas outside of these sub-regions are opaque. Preferably, the sub-regions are such that $A_1 = A_2 = A_3 = A_4$. Recall that these identifying sub-regions may be employed to align a mask vis-a-vis its positioning with a reference component and a test component, or their optical images.

Figure 4A:
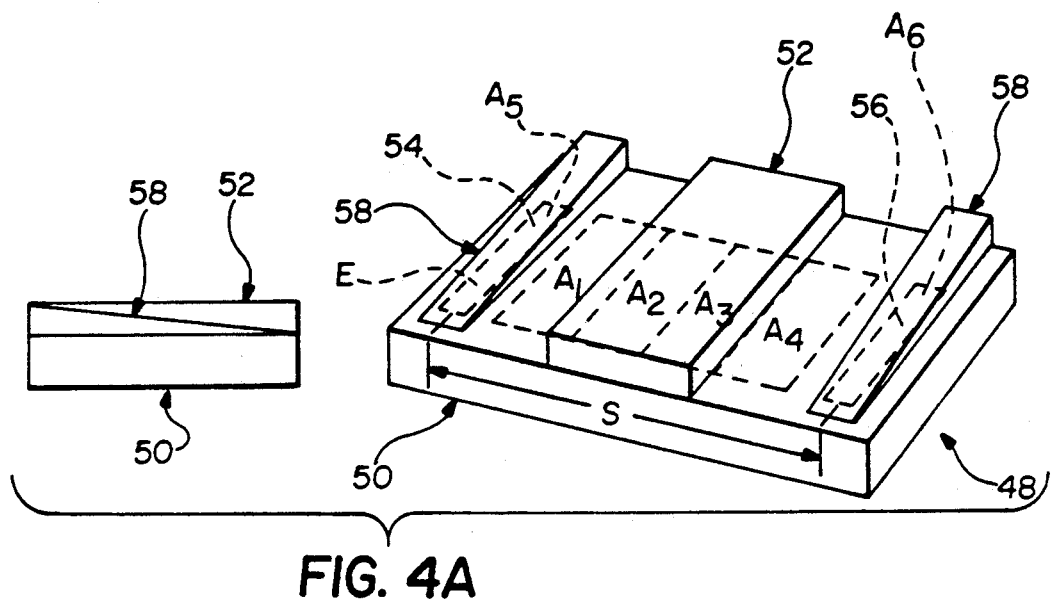
FIGS. 4A-D show masks that can be used in the steps of the present invention.

The FIG. 4A mask 48 comprises a squared glass substrate 50 and a "fine alignment" overlay 52 having an index of refraction $n_1$. An index of refraction $n_2$ is that of air, or 1.0. The overlay 52, in fact, overlaps subregions $A_3$, $A_2$, and is thus capable of overlapping top and lower portions of a reference component image and a test component image, respectively.

The FIG. 4A mask 48 also comprises two apertures 54, 56 ($A_5$, $A_6$) The apertures 54, 56 each have a preferred rectangular shape E, and are separated by a distance S. The significance of the geometric shape and relationship (E, S) will be set out more fully below, where it is shown how these geometrics can empirically relate to a quantitative determination of coarse alignment or large petal piston D.

The FIG. 4A mask 48 further comprises a tangential refractive optical wedge 58 that can function to spatially separate the coarse and fine alignment entities, thus realizing independence and simultaneity of alignment ascertainment.

Figure 4B:
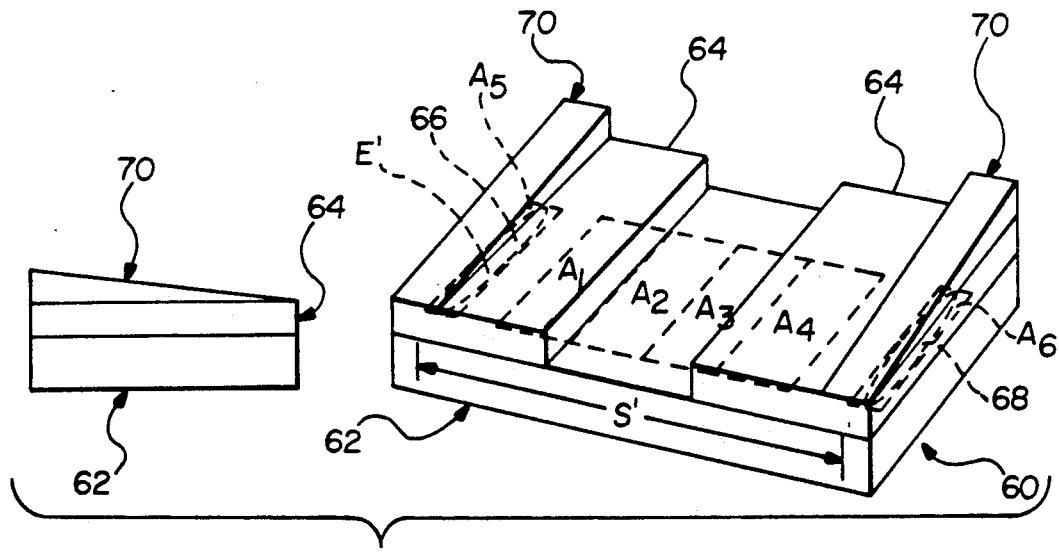

A FIG. 4B mask 60 comprises a squared glass substrate 62, and a "split" overlay 64 having an index of refraction $n_1$. Here, the "fine alignment" overlay 64 is "split" in the sense that it is capable of overlapping a bottom and top portion of a reference component image and a test component image, respectively. The FIG. 4B mask 60 also comprises two spaced-apart (S') and elliptical (E') apertures 66, 68 ($A_5$, $A_6$), and a coarse-fine alignment separation wedge 70.

Figure 4C:
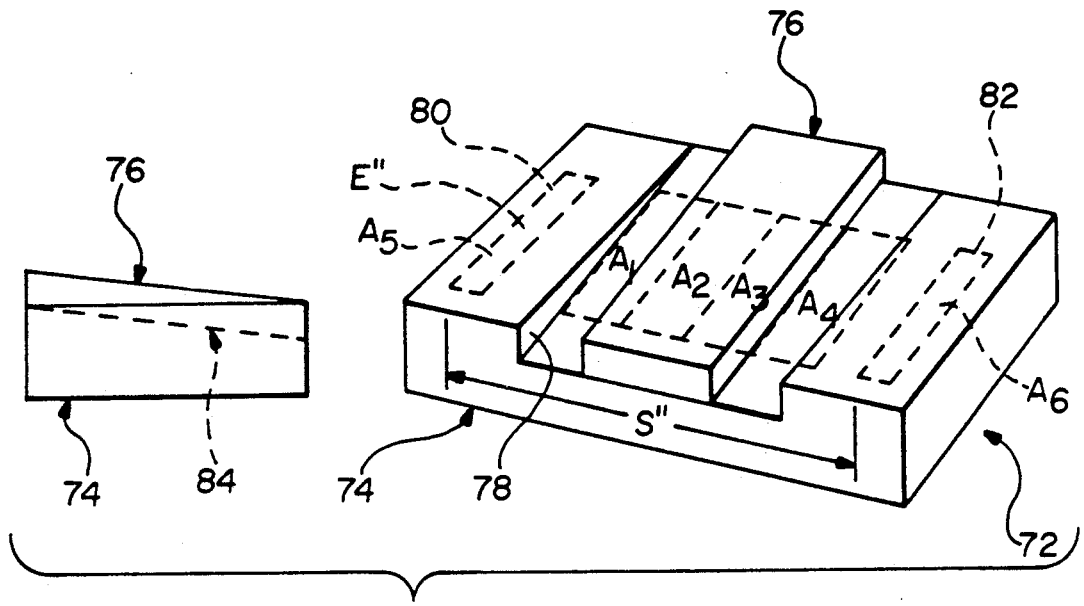

A FIG. 4C mask 72 comprises a squared glass substrate 74 and two overlays 76, 78, of the same thickness, having indices of refraction $n_1$, $n_2$, respectively. Here, the "fine alignment" overlay 76 can overlap a bottom of a reference component image, and a top of a test component image, and the fine alignment overlay 78 can overlap a top of a reference component image and a bottom of a test component image. The mask 72 also comprises two spaced-apart (S") and rectangular (E") apertures 80, 82 ($A_5$, $A_6$), and a coarse-fine alignment separation wedge 84.

Figure 4D:
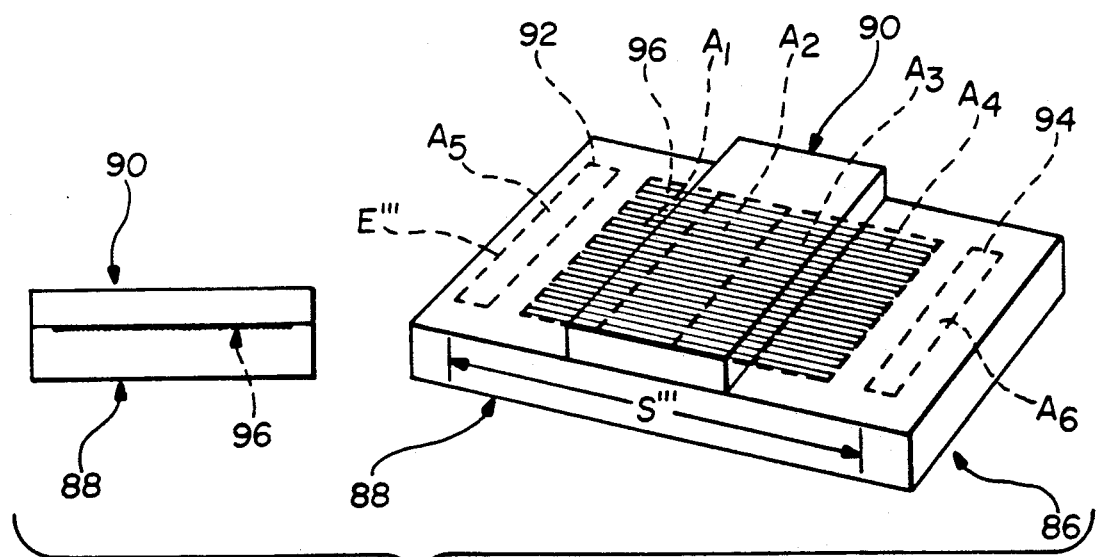

A FIG. 4D mask 86 comprises a squared glass substrate 88 and an overlay 90 having an index of refraction $n_1$ Here, the "fine alignment" overlay 90 can overlap a top and a bottom portion of a test component image, only. The mask 86 further comprises two spaced-apart (S''') and rectangular (E''') apertures 92, 94 ($A_5$, $A_6$), and a coarse-fine alignment separation optical diffraction grating 96.

Figure 3:
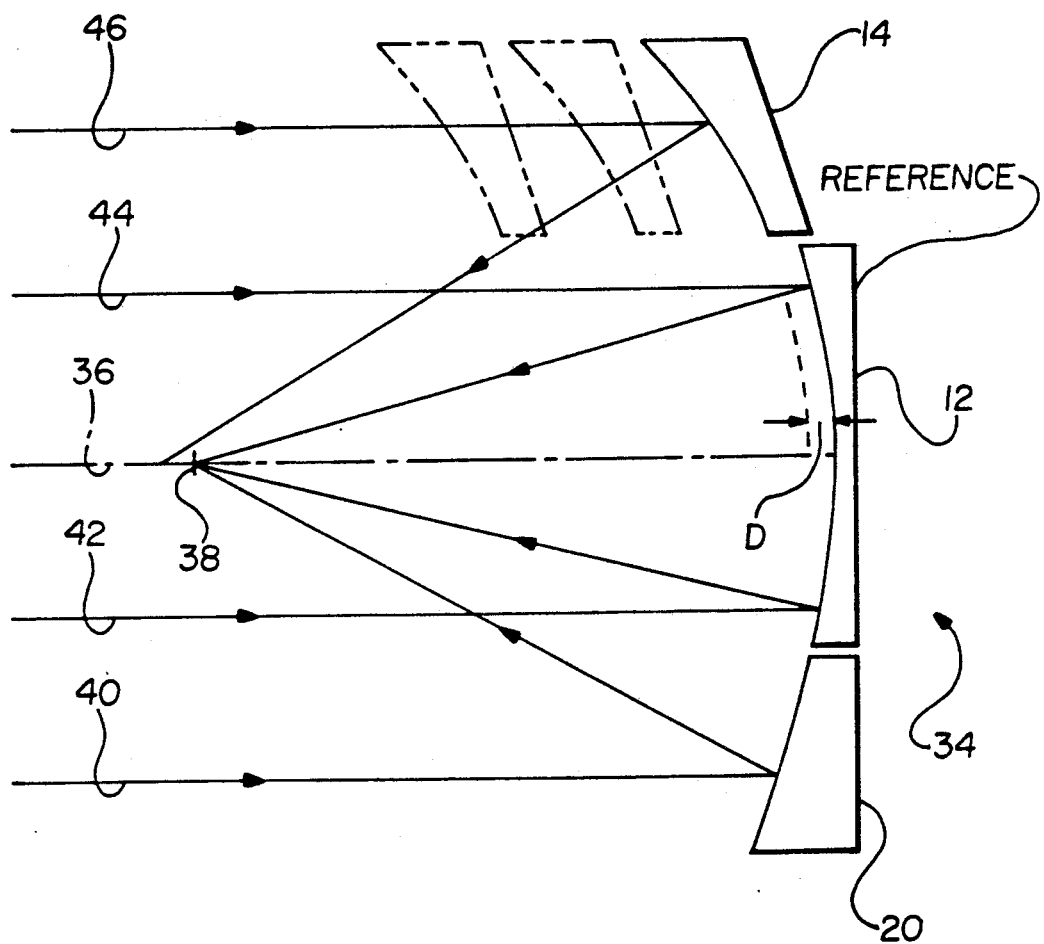
FIG. 3 shows a partial edge-view of the FIG. 1 segmented optical imaging assembly.
Figure 5A:
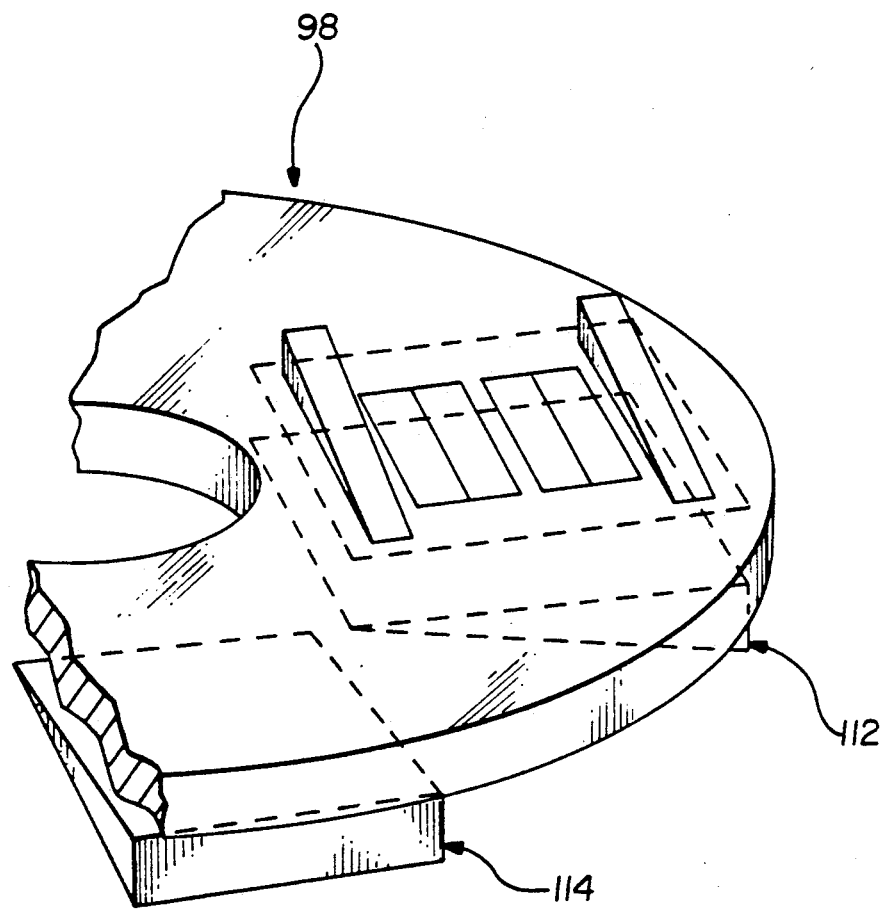
FIGS. 5a, b show a preferred mask template of the present invention, suitable for employment in a segmented imaging assembly.

Attention is now directed to FIGS. 5A, B, which show a perspective (FIG. 5a) and a front view (FIG. 5b) of a mask template 98. The mask template 98 comprises six separate masks (100-110), each formed in the FIGS. 4A-D manner. The mask template 98 is preferably used to simultaneously and independently determine coarse and fine piston alignment, in a segmented imaging assembly of the type shown in FIG. 3, supra. Accordingly, each of the six separate masks (100-110) may be dedicated to one each of the six FIG. 3 petals. To realize the indicated independence of alignment determination, the FIGS. 5A, B mask template 98 preferably further comprises a set of six radial separation refractive wedges (112-122).

II. A Segmented Optical Assembly

As summarized above, the novel composite mask of the present invention is suitable for employment in a method for determining petal piston in a segmented imaging assembly. Breaking down the phrase, "segmented imaging assembly", note that the term "segmented" imaging assembly has been generally defined, above. Note, furthermore, that the term "imaging" assembly is one that is capable of imaging radiation over a large portion of the electromagnetic spectrum, including, for example, the microwave, radiowave, or optical portions.

Figure 6:
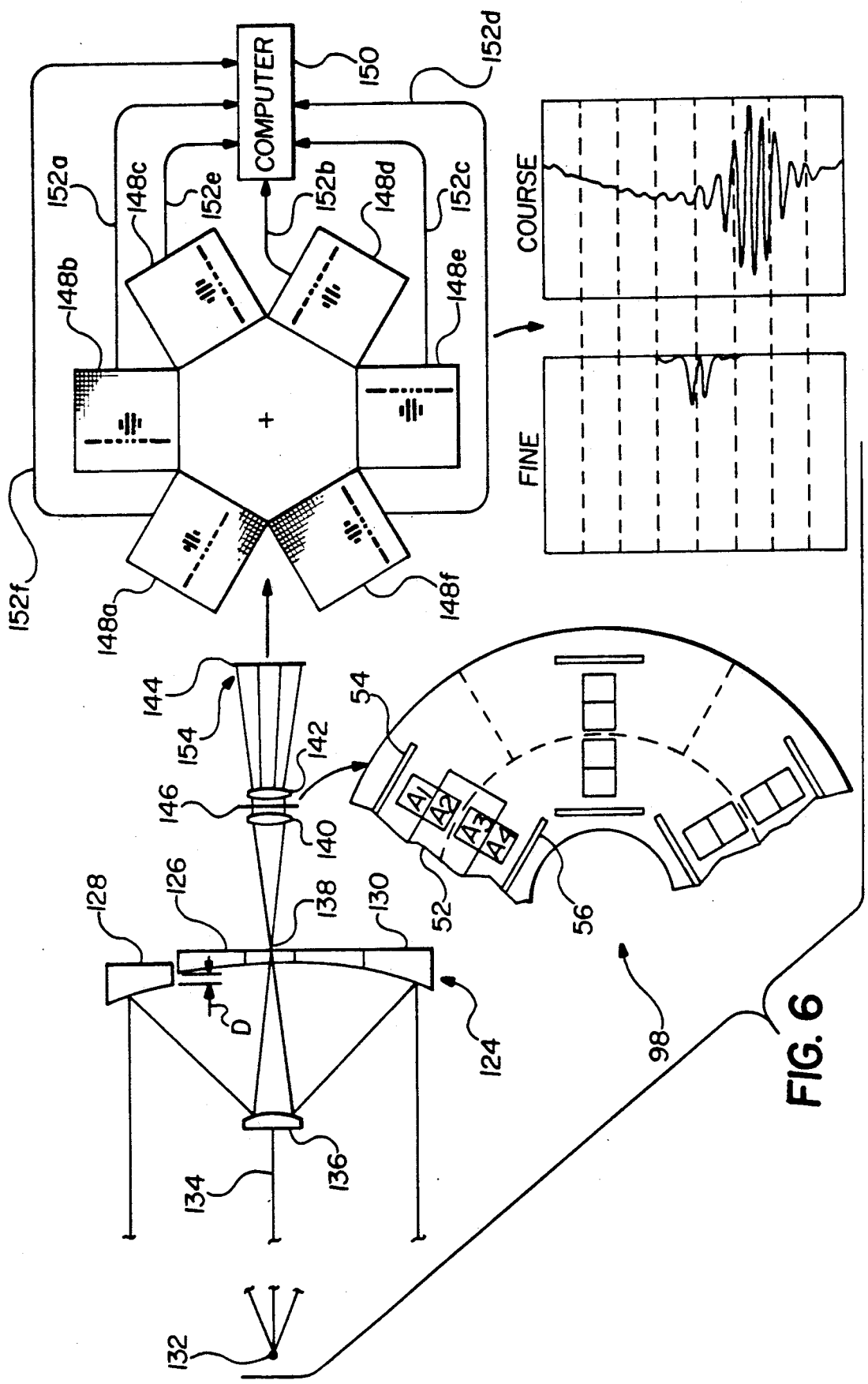
FIG. 6 shows a segmented optical imaging assembly used to demonstrate the steps of the present invention.

The mask of the present invention is preferably demonstrated by reference to a segmented optical assembly, of the type shown in FIG. 6 as numeral 124.

The FIG. 6 optical assembly 124 comprises a segmented imaging system comprising a conventional mirror reference component 126, and arbitrarily spaced-apart conventional mirror test components 128 and 130. The mirror reference component 126 and the mirror test components 128, 130 are physically de-coupled imaging components, designed to act in an imaging function as a single, larger monolithic component. It is an objective of the method of the present invention, as disclosed in detail below, to provide a quantitative determination of a real time mirror test component piston of the component 128 with respect to the mirror reference component 126.

Continuing, the FIG. 6 optical assembly 124 further includes a conventional polychromatic source ($\lambda$) of radiation 132, that can output a polychromatic radiation beam along an assembly optical axis 134.

The FIG. 6 optical assembly 124 also includes a secondary mirror 136 that can function to form an image of the source 132 at a location 138, so that, in turn, this image may be relayed by a set of conventional lenses 140, 142 to a source conjugate image plane 144. Note, further, that the location of the optics 136, 140, in turn, defines a location of a pupil conjugate image plane 146, that is the image of the system 126, 128, 130.

The image at the source conjugate image plane 144 is coincident with a conventional CCD photodetector array 148. The CCD photodetector array 148a-f can detect an image photon intensity distribution. A subsequent evaluation of point spread functions (PSF) corresponding to a photon intensity distribution, may be effected by way of a conventional computer 150, connected to the CCD photodetector array 148, along a set of lines 152a-f.

III. Employment of the Novel Mask in a Coarse Alignment Method

As alluded to above, it is one objective of the present invention to use the novel composite mask to provide a quantitative real time determination of the FIG. 6 test component 128 coarse piston displacement D, with respect to the reference component 126. This can be done in accordance with two method steps, now to be detailed.

Step 1: Intercepting Preselected Portions of the Imaged Radiation Beam with a Mask.

Figure 5B:
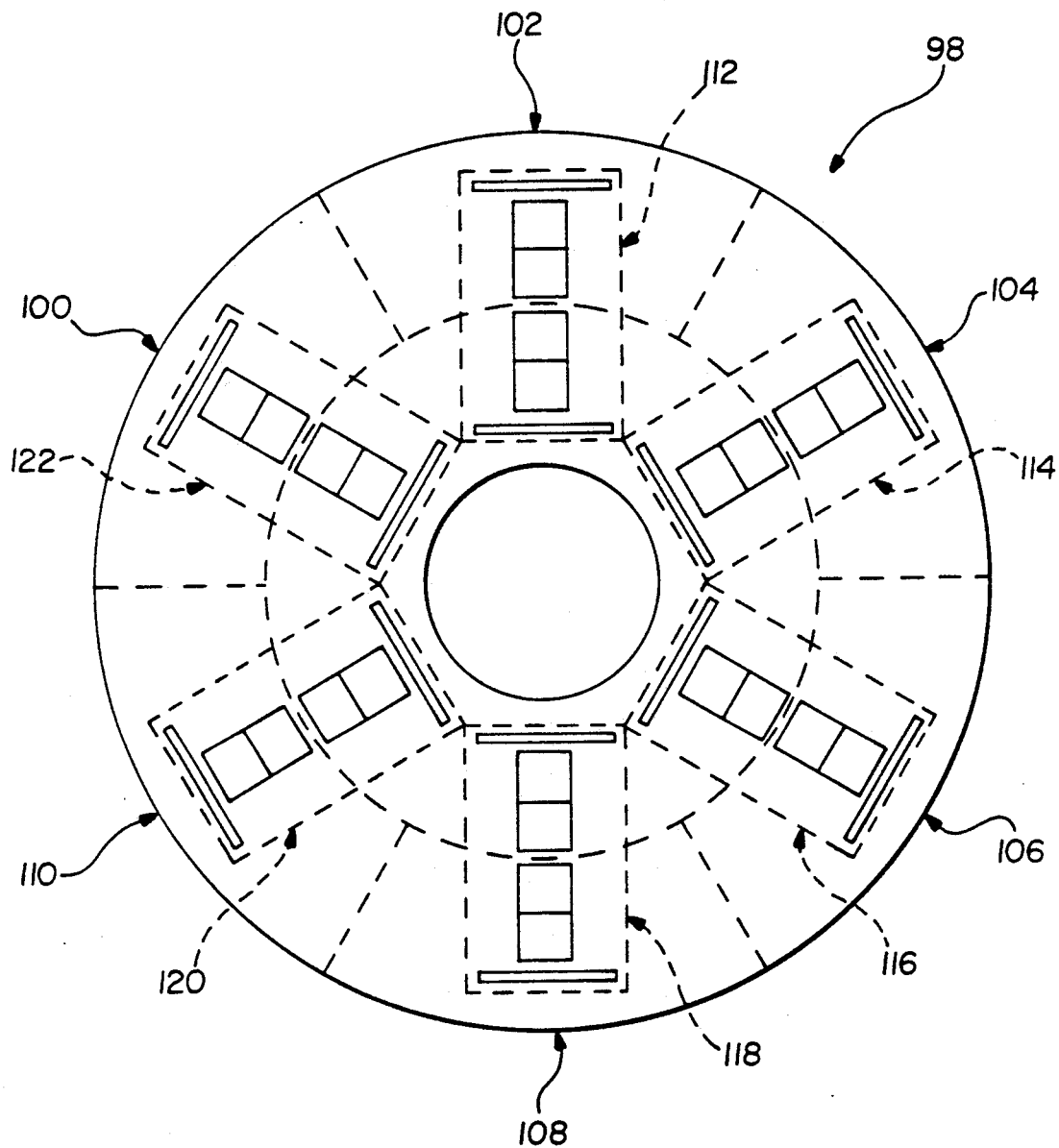

Step 1 of the coarse alignment method requires intercepting a preselected portion of an imaged radiation beam (formed by the test component 128 and the reference component 126), with a portion of the FIG. 5b mask template 98.

For the sake of example, the FIG. 5b mask template 98 may be chosen for incorporation into the FIG. 6 optical assembly 124, and preferably positioned at a normal to the FIG. 6 optical axis 134, and coincident with the pupil conjugate image plane 146. In this way, the mask template 98 can function so that the first aperture 54 can be dedicated to radiation imaged by the reference component 126, and the second aperture 56 can be dedicated to radiation imaged by the test component 128. This action creates a real time masked image 154. The real time masked image 154, in turn, can impinge on the CCD photodetector array 148, thus setting the stage for Step 2.

Step 2: Interrogating an Envelope and a Fine Structure Spacing of the Real Time Masked Image, as a Measure of the Coarse or Large Petal Piston of the Segmented Imaging System.

Step 1, in summary, can generate a real time masked image 154. The real time masked image 154, in turn, can impinge on the FIG. 6 CCD photodetector array 148. As subsequently effected by the computer 150, one can plot the CCD photodetector array 148 intensity (I) as a function of its spatial positioning (x), as shown in FIG. 7, to thus generate a coarse alignment or large petal piston curve 156.

Figure 7:
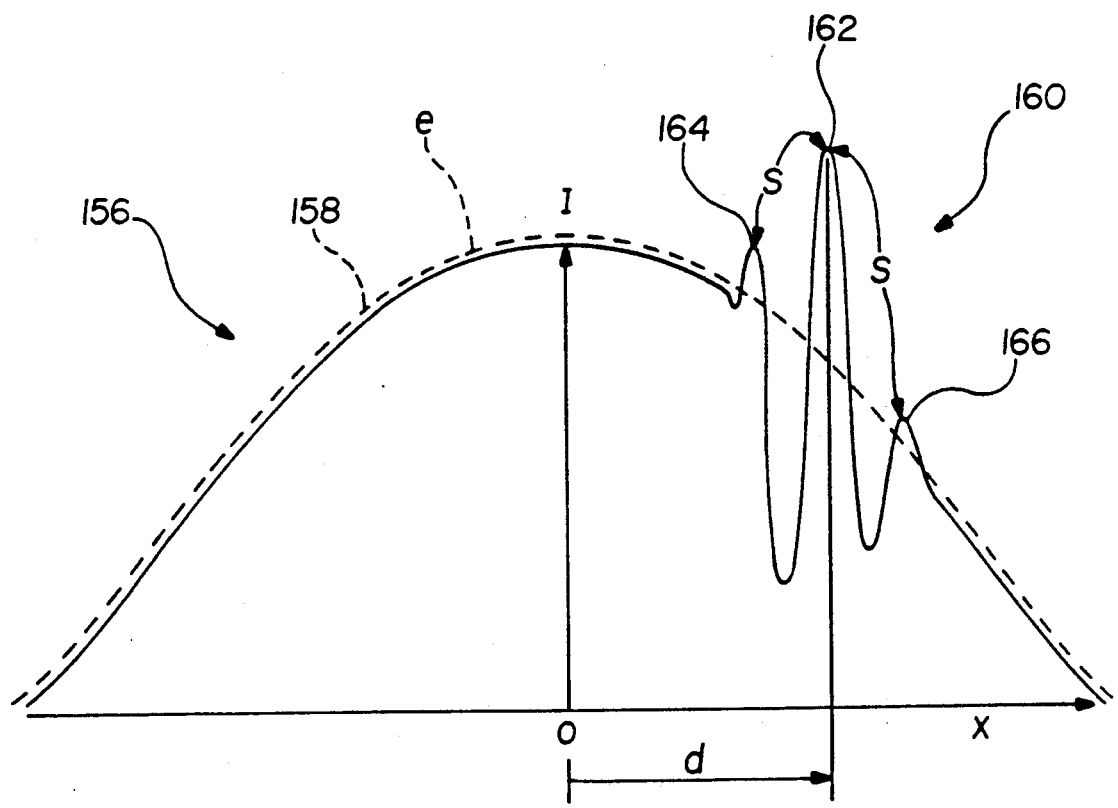
FIG. 7 shows a point spread function generated in accordance with first and second coarse alignment method steps.

Restated, the FIG. 7 coarse alignment curve 156 shows intensity I as a function of spatial position x, for the case where the two slit mask intercepts a radiation beam imaged by the displaced (D) test and reference components 128,126.

The FIG. 7 coarse alignment curve 156, in detail, comprises a broad envelope function e (158) and a highly modulated region 160. The highly modulated region 160 comprises a unique and intense central singularity or spike 162, flanked by two spaced-apart (s) lesser spikes 164, 166. The form of the envelope function e (158) is a known characteristic, determined by a known Fourier transform of the geometric shape (E) of the mask aperture. The spacing s of the spikes (162, 164, 166) from each other is a known characteristic, determined by the known geometric spacing (S) of the mask apertures.

FIG. 7 also denotes a distance parameter d, defined along the x axis from an origin or photometric centroid (o) to the intense central spike 162. This distance parameter d is a direct quantitative measure of the sought-for large petal piston (D) of the reference component 126 with respect to the test component 128. This unique relationship is given by the following equation:

$$D = \frac{ds}{2Mf}.$$

where:
f is a focal length of the FIG. 6 collection optic assembly comprising the components 126, 128, 130 and 136, and M is a magnification of the FIG. 6 relay optic assembly comprising the lenses 110 and 142.

IV. Employment of the Novel Mask in a Fine Alignment Method

As alluded to above, it is an objective of the present invention to use the FIG. 5b mask template 98 to provide a quantitative real time determination of the FIG. 6 test component 128 fine piston displacement D, with respect to the reference component 126. Note that this fine alignment determination occurs independently, yet simultaneously, with the coarse alignment determination, supra, a capability realized by way of the novel composite imaging mask of the present invention.

An important advantage that is inherently realized by this capability is that the accuracy of the coarse alignment determination is enhanced by the simultaneous and proximate presence of the fine alignment intensity pattern of the same photometric detector. In particular, the photometric centroid of the fine alignment intensity pattern may be used to more accurately define the centroid of envelope function (e).

The fine alignment method may be specified in accordance with the following two steps.

Step 1: Masking At Least One Portion of at Least One of the Reference Component and the Test Component, so that a Portion of the Imaged Radiation Beam Incurs a Predetermined and Differential Phase Retardation. Relative to Another Portion of the Beam Passing through the Mask Thereby Creating a Real Time Masked Image Assume now, again for the sake of pedagogy, that the FIG. 5b mask template 98 remains inserted in the FIG. 6 optical assembly 124. Recall, further, that the mask template 98 is constructed so that it comprises a phase retardant overlay 52, and that this overlay 52 is spatially configured so that when the mask template 98 is inserted in the FIG. 6 optical assembly 124, the phase retardant overlay 52 equally overlaps a top and a lower portion of a reference component image and a test component image, respectively.

This action, therefore, inherently satisfies step 1, i.e., we have masked preselected portions of the test component image and the reference component image, so that a portion of the radiation beam imaged by the masked portions of the test component 128 and the reference component 126, incurs a predetermined and differential phase retardation ($\phi_2$) relative to unmasked portions ($\phi_1$).

All other radiation incident on the mask, outside of the areas $A_1$ through $A_4$, is blocked by an opaque screen. The radiation passing through the mask template 98, on the other hand, continues through the FIG. 6 lens 142 to form an image at 154, which we call a real time masked image. The real time masked image, as detected by the FIG. 6 CCD photodetector array 148, can generate a real time image photon intensity distribution, or real time point spread function (PSF).

An Interpolation: Motivation for Step 2

An interpolation between Step 1 and 2 is now provided, in order to provide a motivation and a deeper understanding of Step 2.

We begin by noting that Step 1 introduces the notion of a real time point spread function, generated by intercepting the radiation beam in the FIG. 6 optical assembly 124, with a specially constructed phase retardant mask, in fact, the mask template 98 designed in accordance with FIG. 5b.

Figure 8:
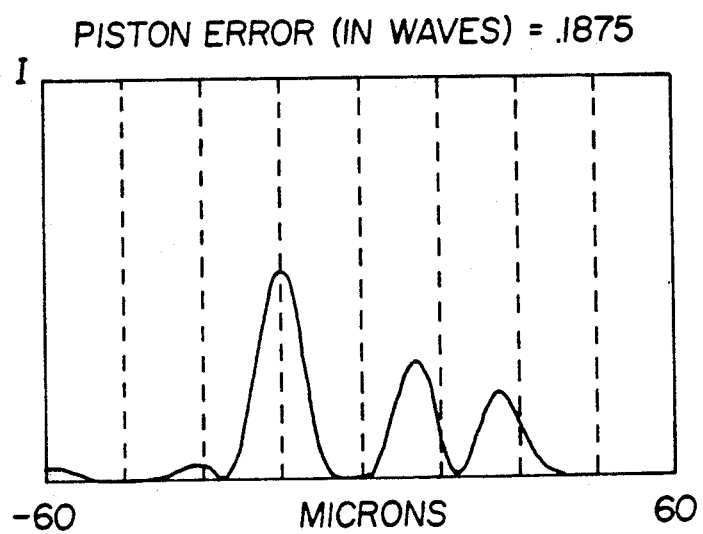
FIG. 8 shows a point spread function generated in accordance with first and second fine alignment method steps.

FIG. 8 shows this point spread function: it is a plot of photon intensity I versus spatial distance (in microns) as measured across the FIG. 6 photodetector array 148.

The FIG. 8 point spread function also contains, although within an embedded context, the quantitative information as to how much piston has been introduced into the FIG. 6 optical assembly 124, due to the (above stated) arbitrary displacement D between the reference component 126 and the test component 128. Step 2, in conjunction with Step 1, provides a solution to this question of "how much" piston. Why the Steps 1-2 can provide an answer to this question of "how much" piston may be satisfied by stepping back for a moment from the previous detail, and considering the following.

Imagine, firstly, that the FIG. 6 optical assembly 124 is modified so that there is no piston between the reference component 126 and the test component 128 and, that there is no phase delay in any portion of a mask.

Figures 9A, 9B, 9C, 9D:
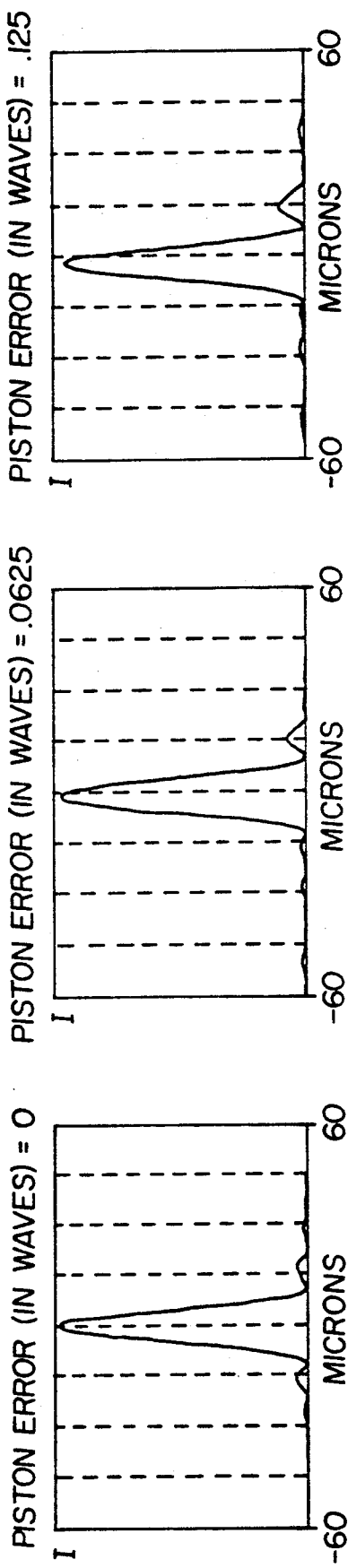
FIGS. 9A-I show fine alignment point spread functions generated for the FIG. 6 assembly, but without the masking steps of the present invention.

Then, everything else being the same, a point spread function for this case is of the type shown in FIG. 9A, namely an ideal point spread function.

Imagine, secondly, that the test component 128 now begins to move through a series of known displacements ΔX with respect to the reference component 126, thus introducing piston (e.g., 1/16, ⅜ wave, ¼ wave, ⅜ wave, ½ wave). The sequence of known displacements ΔX results, in turn, in a sequence of point spread functions, shown in FIGS. 9B-I.

We have made the following two observations about the FIGS. 9A-I point spread functions.

Figure 9E:
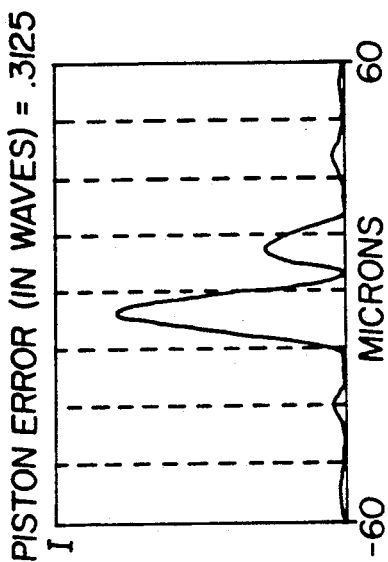
Figure 9F:
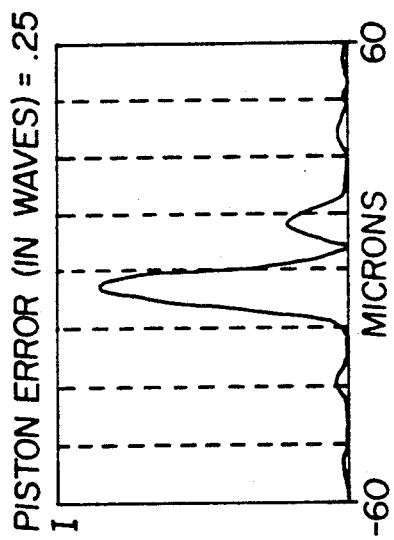
Figure 9G:
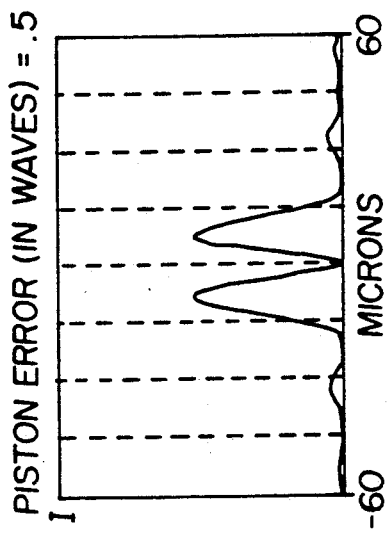
Figure 9H:
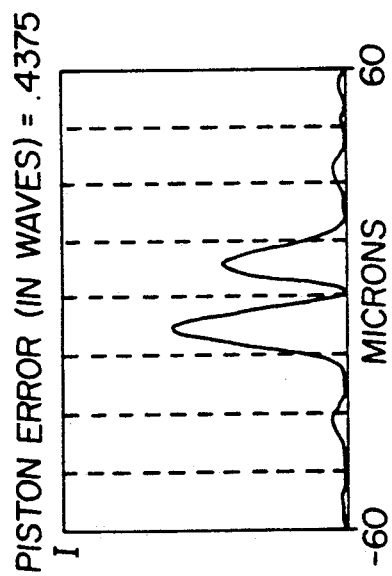
Figure 9I:
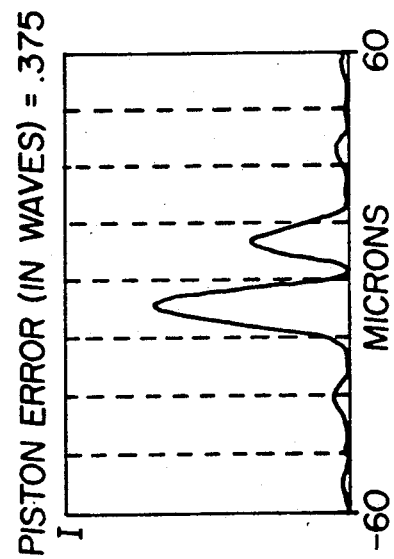
Figure 10A:
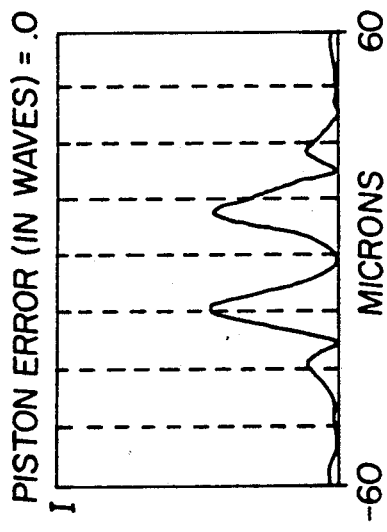
FIGS. 10A-I show the FIG. 9 fine alignment point spread functions, modified in accordance with masking steps of the present invention.
Figure 10B:
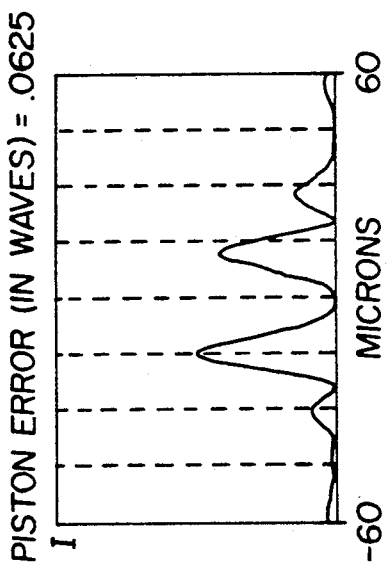
Figure 10C:
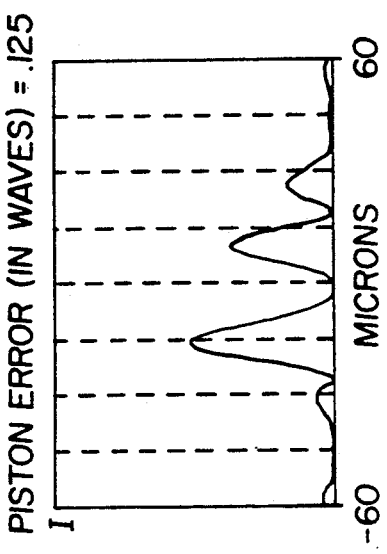
Figure 10D:
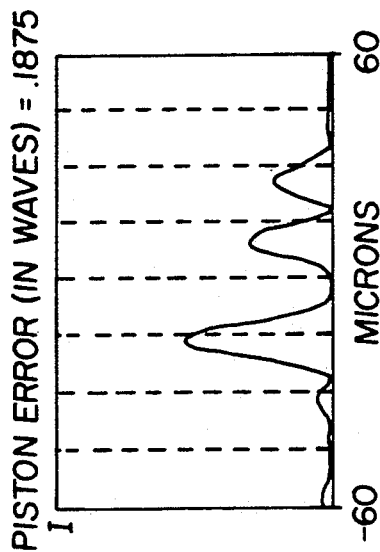
Figure 10E:
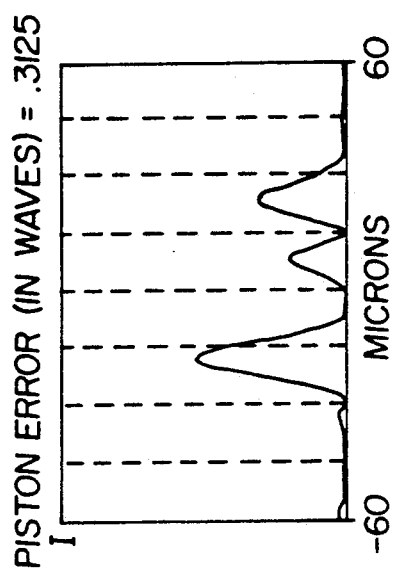
Figure 10F:
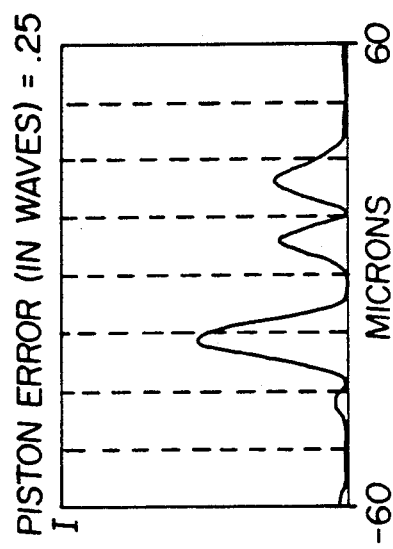
Figure 10G:
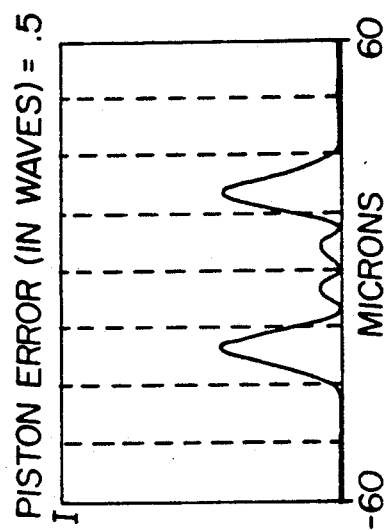
Figure 10H:
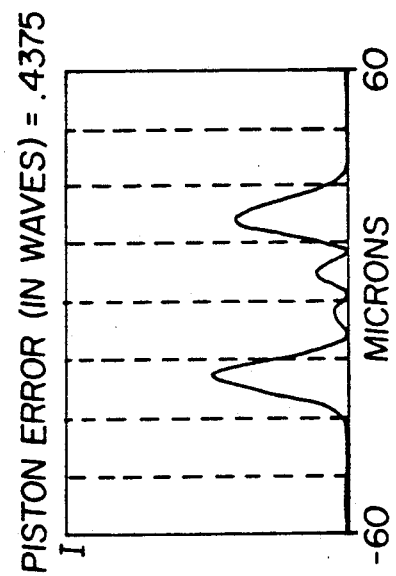
Figure 10I:
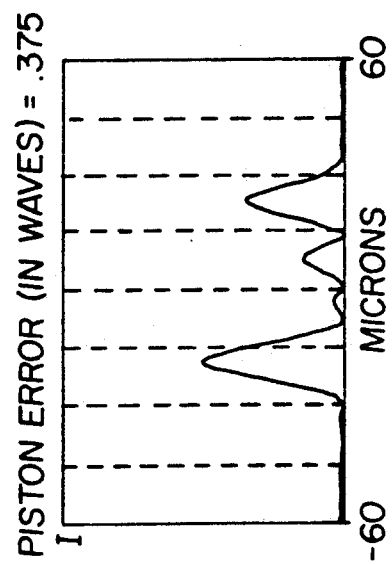

First, empirically, as one scans the sequence, so that the magnitude of the waves increases (FIGS. 9A-I), it can be observed that energy is gradually redistributed from a large center peak, with negligible side lobes (FIGS. 9A, B, C, D), until, with a further increase in magnitude of wave, the energy is predominantly located in the side lobes (FIGS. 9E, F, G, H, I).

Now, secondly, since a quantitative determination of piston may be based on precisely quantifying the sidelobe energy distribution, it is clear from FIGS. 9A-I that this precision may be qualified for those cases where a signal to background noise ratio is low in the area of interest, i.e., where the energy is predominantly in the center, and not in the side lobes. But this last situation is precisely the case for determinations of piston which are especially of present interest, namely, where the piston is very small, for example, less than ¼ wave. On the other hand, a required precision may be enhanced for the cases where the signal to noise ratio is high in the area of interest, i.e., for the cases of relatively large piston, e.g., approaching ½ wave, where the energy is predominantly located in the side lobes.

In recognition of these two observations, we modify the point spread function by way of introducing a phase delay in a portion of the transmitted beam (by way of the masking steps FIGS. 4A-C), as described in step 1, such that a new family of point spread functions may be defined as shown in FIGS. 10A-I. In this way, therefore, one can move the "window" of analysis of the point spread function, in a known way, from the less precise regions (low signal to noise ratio), to a more precise region (high signal to noise ratio), so that, in effect, one always has access to a high signal to noise ratio, even for the cases of arbitrarily small piston, i.e., much less than ¼ wave, for example, 1/32 wave. (Note that for the case of the FIG. 4D mask, its utility is such that it shifts the window of analysis by one half wave, so that FIG. 9I corresponds to the case where there is no piston present.)

Step 2: Comparing the Real Time Masked Image Against a Family of Off-line Images Generated for a Sequence of Known Petal Position Errors for Determining the Magnitude of the Real Time Test Component Piston.

Step 2 comprises several independent notions, two of which have been developed above.

First, "the real time masked image" (and its corresponding point spread function), have been developed above, in Step 1 and FIG. 8. This real time masked image, it is recalled, is generated by the FIG. 6 optical assembly 124 for the case of an arbitrary displacement D between the reference component 126 and the test component 128, and with the phase retardant mask template 98 in place. It is now required to precisely determine how much piston has been induced by this displacement D.

Second, Step 2 requires comparing this real time masked image, against a family of off-line images, generated for a sequence of known petal positions. This action, actually, has already been effected in part, since the family of point spread functions FIGS. 10A-I, developed above in the interpolation section, provides a required family of off-line images generated for a sequence of known petal positions.

Information subsumed by the FIGS. 10A-I point spread functions is re-formatted in a Table, FIG. 11. The Table columns are dedicated to OPD (waves), maximum left and right peak intensities, and two algebraic ratios (to be explained below).

Figure 12A:
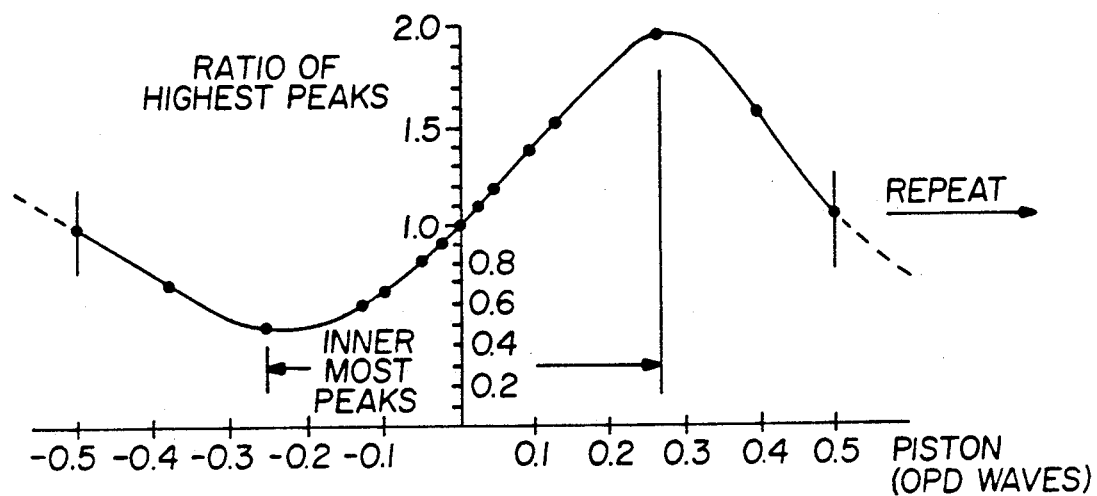
FIGS. 12a, b are a set of point spread function intensity curves derived from the FIG. 11 Table.

The information subsumed by the FIGS. 10A-I point spread functions has been re-formatted in the FIG. 11 Table, as an intermediate step, to the end of plotting points assigned by the Table, onto a set of PSF intensity ratio curves shown in FIGS. 12A, B. The FIGS. 12A, B curves, accordingly, each plot intensity ratio versus piston (OPD) waves, for the family of known petal position errors.

Step 2, finally, requires comparing the real time masked image (FIG. 8) against the family of off-line images, now captured in the FIGS. 12A, B curves. This comparison can be done in at least two different ways (hence, FIG. 12A, FIG. 12B). The difference is based on which of the two algebraic ratios (from the Table, columns A, B) is selected, the second ratio being preferred, since it can yield an enhanced precision. The step of comparison is now further explained, therefore, with reference to FIG. 12B, and by way of the following algorithm.

Figure 12B:
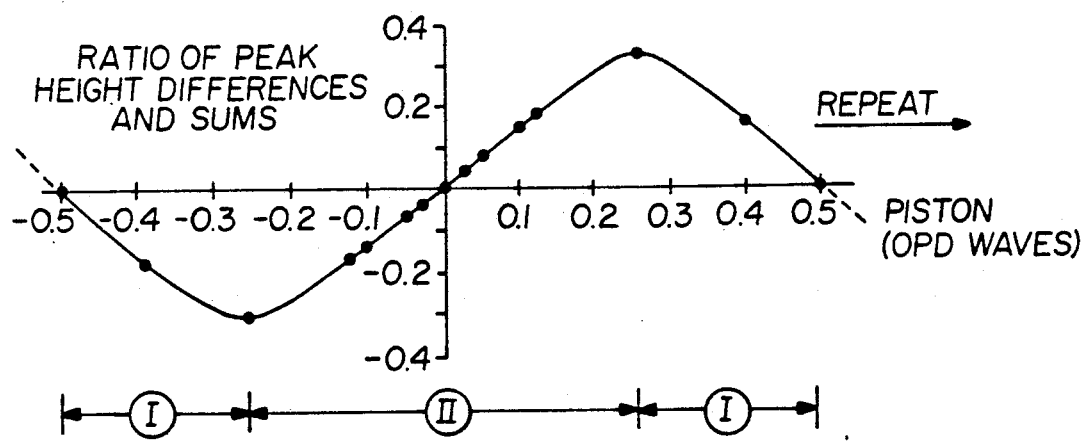

Examination of FIG. 12B shows that it has been split into first (I) and second (II) regimes. The computer 150 can be routinely programmed to ask: Is the FIG. 8 point spread function within the first (I) or second (II) regime? This interrogation is done to avoid ambiguity. The question may be answered by empirically determining how far apart are the FIG. 8 dominant peaks. Thus: if the distance between the two dominant peaks is greater than a specified ε, one constitutes the algorithm in the first (I) regime. On the other hand, if the distance between the two dominant peaks is less than a specified ε, one continues the algorithm in the second (II) regime.

Finally, within a predetermined regime, I or II, the required measurement of the piston introduced by the arbitrary displacement D, is mapped by first locating on the ordinate a number determined by algebraically computing the FIG. 8 measure of:

$$\frac{\text{left peak intensity} - \text{right peak intensity}}{\text{left peak intensity} + \text{right peak intensity}} = \text{ordinate parameter},$$

and then mapping the ordinate parameter to the curve and its correspondent on the abscissa, namely, the piston (in optical path difference).

What is claimed is:

1. A composite imaging mask suitable for employment in a method for determining coarse and fine petal piston alignment in a segmented imaging assembly, the mask comprising:
    a) a transparent substrate comprising two spaced-apart apertures dedicated to coarse petal alignment;
    b) a first overlay deposited on a face of the substrate, for defining four phase retardation regions dedicated to fine petal alignment;

c) a second overlay comprising an opaque coating, the second overlay deposited on the face of the substrate and complementary to the four phase retardation regions and the two apertures; and, d) means for spatially separating the coarse alignment apertures and the fine alignment regions.

2. A composite imaging mask according to claim 1, wherein the transparent substrate comprises glass.

3. A composite imaging mask according to claim 1, wherein the first overlay comprises magnesium fluoride.

4. A composite imaging mask according to claim 1, wherein the means for spatially separating the course alignment apertures and the fine alignment regions comprises a tangential refractive wedge.

* * * * *